Figure 1:
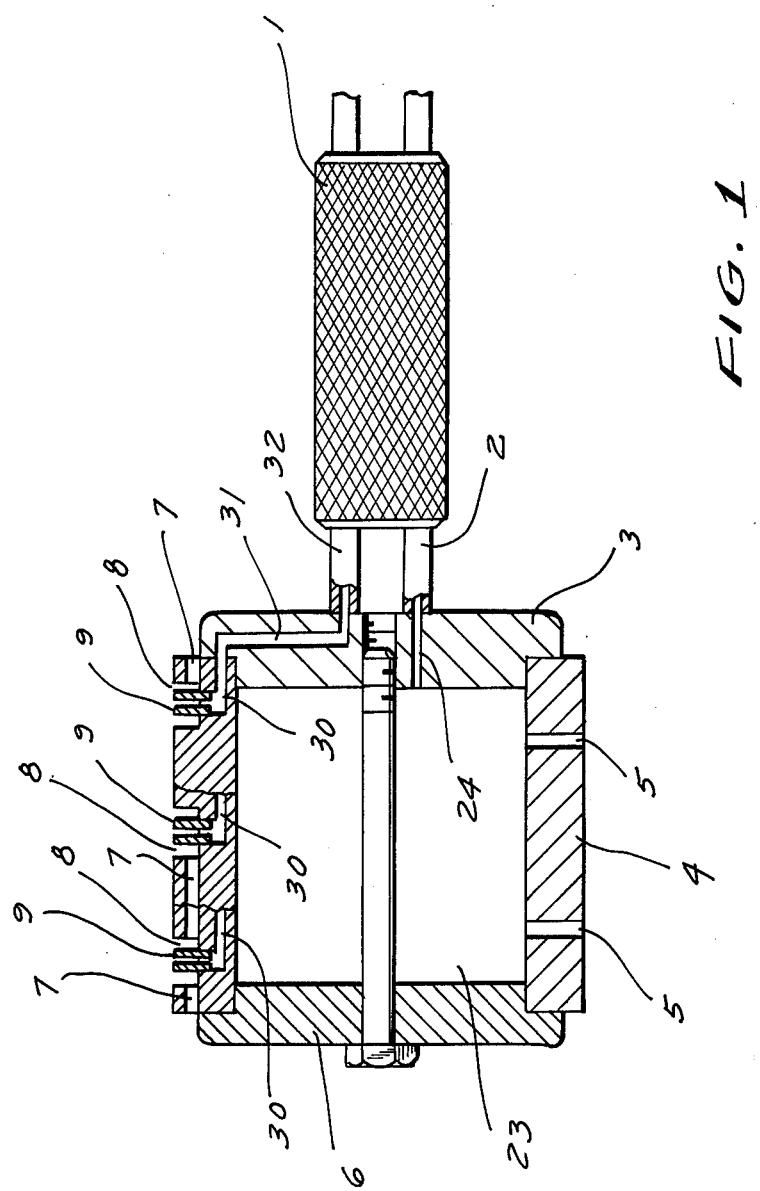

United States Patent [19]

Radev et al.

[11] 4,121,451
[45] Oct. 24, 1978

[54] APPARATUS FOR MEASURING NON-CYLINDRICITY OF SURFACES

[75] Inventors: Hristo Kirilov Radev; Iliya Ivanov Lazarov; Tzanko Georgiev Grekov, all of Sofia, Bulgaria

[73] Assignee: Institute "Lenin" Vish Machinno-Elektrotechnicheski, Sofia, Bulgaria

[21] Appl. No.: 809,860

[22] Filed: Jun. 24, 1977

[30] Foreign Application Priority Data

Jun. 24, 1976 [BG] Bulgaria .................................. 33574

[51] Int. Cl.² ........................................... G01B 13/16
[52] U.S. Cl. .................................................. 73/37.9
[58] Field of Search ............................. 73/37.9, 37.5; 33/DIG. 2

[56] References Cited

U.S. PATENT DOCUMENTS

| | | | |
|---|---|---|---|
| 2,392,016 | 1/1946 | Wattebot | 73/37.9 X |
| 2,706,339 | 4/1955 | Aller | 73/37.9 X |
| 3,201,974 | 8/1965 | Croshier | 73/37.9 |
| 4,016,747 | 4/1977 | Radev | 73/37.9 |

FOREIGN PATENT DOCUMENTS

254,118  1/1970  U.S.S.R. .................................. 73/37.9

*Primary Examiner*—Richard C. Queisser
*Assistant Examiner*—Joseph W. Roskos

[57] ABSTRACT

Apparatus for measuring non-cylindricity of surfaces. When measuring the non-cylindricity of bores, a plurality of pneumatic measuring transducers are mounted in radial holes in a circular cylindrical base element which is adapted to be introduced into the bore. Surrounding the outer ends of the nozzles of the measuring transducers are hollows which are connected to the atmosphere by means of passages extending within the body of the base element. The outer faces of the pneumatic nozzles serving as measuring transducers and the external cylindrical surface of the base element all lie on a common circular cylindrical surface. Successive measurements may be taken with the base element disposed in various axial and angular positions with respect to the bore. Means are provided for turning the base element either by hand or mechanically.

4 Claims, 3 Drawing Figures

APPARATUS FOR MEASURING NON-CYLINDRICITY OF SURFACES

This invention relates to an apparatus for measuring the non-cylindricity or unroundness of surfaces of various articles; the apparatus can be employed under a number of conditions, including the measuring of workpieces being formed by processing machines.

Pneumatic apparatuses are known for measuring the non-cylindricity of internal surfaces such as holes, bores, and the like. Such known apparatuses have a base element in the form of a plug, which self-centers itself directly on the surface being measured by flowing streams of air which constitute aerostatic supports. The working surface of the base element is connected with the atmosphere by radial and axial channels which divide the working surface into two or more ring-like or rectangular aerostatic supports. Disposed in these channels are pneumatic or other measuring transducers which measure the deviations of the radial distances from the surface of the hole to the axis of the base element at different angular or axial positions of the base element. The base element is connected with a holder or handle by means of an elongated flexible member, and can be moved by hand in the whole or bore being measured into different angular or axial positions.

A disadvantage of the above-described prior apparatuses is that the division of the working surfaces of the base element by channels connected to the atmosphere considerably decreases the self-centering forces acting upon the base element compared to those acting upon a base element having no channels in its outer surface. In the measuring of the non-cylindricity of holes with smaller diameters or shorter lengths, the decreased bearing capacity of the air cushion may lead to difficulty or even impossibility of using the apparatus with an aerostatic self-centering of the base element.

A further disadvantage of a base element provided with external channels is the necessity of making a great number of holes in such element for connecting the channels to the atmosphere, such holes being otherwise not needed for the making of measurements of non-cylindricity.

Another disadvantage of the above-described prior apparatuses is that they provide no possibility for the objective determination of the angular position of the base element with respect to the measured surface for the recording of a profilogram.

The apparatus of the invention has among its objects the overcoming of the above-outlined disadvantages, and to provide an apparatus for measuring non-cylindricity in which the aerostatic supports have an increased bearing capacity, and which provides for determining the angular position of the apparatus with respect to the measured surface, and which also provides for the recording of its profilogram.

In accordance with the invention there is provided an apparatus wherein the measuring transducers are mounted in radial holes on the base element, the outer ends of the transducers being disposed in hollows which are connected with the atmosphere by means of channels extending inside the body of the base element. In the illustrative embodiments, the faces of the pneumatic nozzles which serve as measuring transducers and the external circular cylindrical surface of the base element lie upon a common circular cylindrical surface.

As above-indicated, the apparatus may be turned with respect to the object being measured either by hand or mechanically.

In one embodiment, the base element carries a disc with a resilient tip, such tip contacting the surface being measured. The relative angular position of the disc with respect to the base element is detected by means of a transducer connected to the measuring device.

In a further modification of the apparatus of the invention, there is provided a holder for the apparatus in the form of a handle which makes it possible to place the apparatus by hand in the measuring position. By means of a built-in mechanical appliance in the body of the holder, the base element can be rotated at a constant speed around its axis, so that the angle of rotation changes as a straight-line function of time.

One of the advantages of the apparatus of the invention is that there are no channels connected to the atmosphere on the surface of the base element. This permits the bearing capacity and firmness of the air cushion to be increased considerably. The increasing of the firmness or hardness of the air cushion is particularly important in apparatus employed for the measuring of the non-cylindricity of surfaces of small diameter or short lengths, since it leads to a substantial increase in the accuracy of measurement, as well as increasing the scope of the use of the apparatus.

A further advantage of the apparatus of the invention is its better economy in the use of pressure air which results from the smaller number of nozzles employed and the elimination of a large number of channels on the surface of the base element which were connected to the atmosphere. Because the outer surface of the base element and the outer ends of the pneumatic nozzles serving as transducers lie upon a common circular cylindrical surface, they can all be finished at one time in a single machine operation.

Still another advantage of the apparatus of the invention is that it also provides for the ready determination of the angular position of the base element with respect to the surface being measured, thereby permitting the automatic drawing of profilograms of the surface, whether the apparatus is being turned by hand or mechanically. The measuring and recording of the profilograms may be carried out directly on workpieces being machined, without taking the workpiece from the machine.

Figure 2:
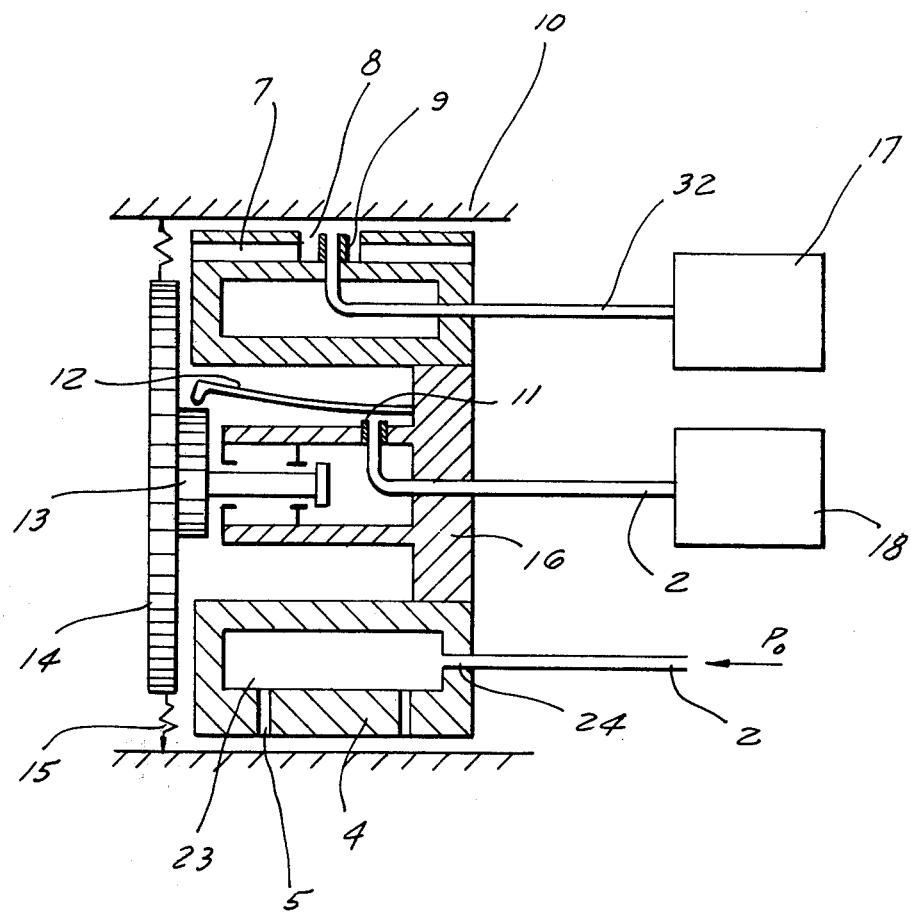
Figure 3:
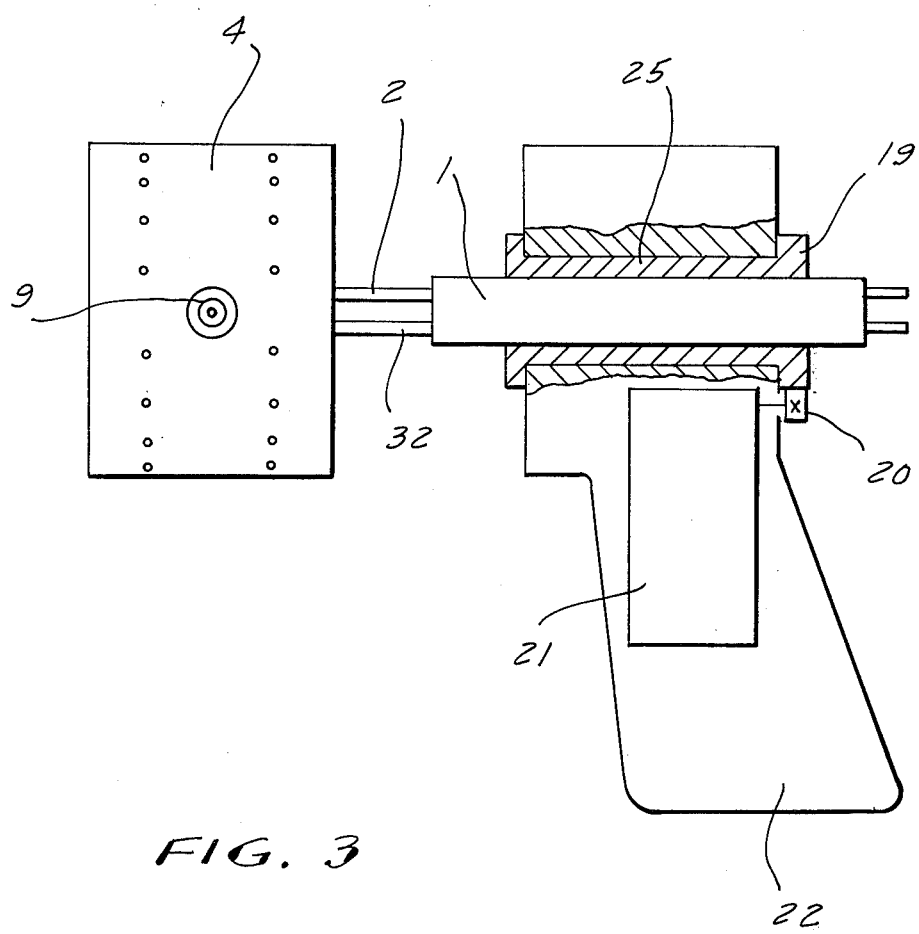

Exemplary embodiments of the apparatus according to the invention are shown in the accompanying drawings, in which:

FIG. 1 is a view partially in longitudinal axial section and partially in elevation of a first embodiment of apparatus in accordance with the invention, such apparatus being adapted for hand operation in the measuring of the non-cylindricity of holes;

FIG. 2 is a view in longitudinal axial section of a second embodiment of apparatus in accordance with the invention for the measuring of non-cylindricity of a hole or bore, such embodiment permitting the objective determination of the angular position of the base element of the measuring apparatus, the measuring apparatus being shown in combination with schematically-illustrated indicating and recording devices; and FIG. 3 is a view partially in longitudinal axial section and partially in side elevation of a third embodiment of measuring apparatus in accordance with the invention, such apparatus incorporating means for mechanically turning the base element of the apparatus with respect to the surface of the bore or hole being measured.

Turning first to FIG. 1, there is there shown a pneumatic device for measuring the non-cylindricity of holes. Such apparatus has a base element 4 in the form of a sleeve with a diameter smaller than that of the hole being measured, there being disclike end closure members 3 and 6 fixedly and sealingly mounted upon element 4. Disposed on the base element 4 are two annular rows of nozzles 5 (only two such nozzles being shown in FIG. 1), the nozzles 5 being connected by means of a common chamber 23 within the base element 4 and a hole 24 through the flange 2 to a flexible conduit 2 which extends through a handle 1. The righthand end of conduit 2 is connected to a source of compressed air (not shown). It will be understood that the jets of air issuing from the annular rows of nozzles 5 create aerostatic supports or air cushions which locate the measuring head 4, 3, 6 coaxially of the hole being measured.

In the base element 4 there are three axially-aligned radial holes 8 connected with the atmosphere by means of channels 7 which extend within the body of the base element 4. Pneumatic measuring nozzles 9 are disposed within the holes or hollows 8 on the base element 4, such nozzles being connected by means of channels 30 within the body of the base element 4 to a channel 31 in the flange 3 and thence to a flexible conduit 32 which extends to a pneumatic indicating device which may be similar to that shown at 17 in FIG. 2. As indicated above, the other surface of the measuring nozzles 9 and the cylindrical surface of base element or sleeve 4 lie on a common circular cylindrical surface.

The above-described apparatus shown in FIG. 1 operates as follows:

The air under pressure supplied through conduit 2 flows out through nozzles 5 and the annular passage formed between the cylindrical surface of the base element 4 and the surface of the hole being measured. Such flowing air forms an air cushion which, because of the averaging effect of the aerostatic support, orients the axis of the base element 4 along the axis of the mean circular cylindrical surface of the hole being measured. Upon turning the measuring head 3, 4, 6 through 360°, the measuring nozzles 9 and pneumatic indicating devices such as that shown at 17 yield the values of the deviations of the radius of the hole being measured with respect to its mean axis in the transverse planes of their respective nozzles 9, i.e., the non-cylindricity, that is, the unroundness or non-straightness, of the hole in a given section is measured or indicated.

The apparatus shown in FIG. 1 is placed in the hole and is rotated by hand. Because of the flexibility of conduits 2 and 32 the bending moments and the radial forces transmitted from the handle 1 to the base element 4 are sufficiently small to ensure a high accuracy of the self-centering of the measuring device in the hole or bore being measured.

The embodiment of the apparatus of the invention shown in FIG. 2 permits the objective determination of the angular position of the base element 4 of the measuring device with respect to the surface of the hole being measured. In this instance the base element 4 is formed in the shape of a doublewalled ring having an annular chamber 23 within it. A sleeve 16 is disposed within the central bore in base member 4, the sleeve being fixedly connected to member 4 so as to rotate therewith. A sleeve of reduced diameter projects to the left from the main body of sleeve 16, such latter sleeve having bearings within which is journalled an axle bearing discs 13 and 14 coaxial with the axle. Attached to the larger, outer disc 14 are two elastic tips 15 the outer ends of which resiliently engage the surface of the hole 10 being measured, thereby restraining the disc 14 from rotation with respect to the surface of the hole 10 when the measuring device including the base element 4, is rotated with respect to the surface of the hole.

The disc 13 has a peripheral surface in the form of an Archimedes spiral. A flat spring 12, having its root attached to the disc 16, extends to the left. The outer end of spring 12 bears a cam follower which constantly engages the peripheral surface of the cam disc 13. The portion of the spring 12 adjacent its root overlies an air nozzle 11 which is affixed to the second, smaller-diametered sleeve secured to sleeve 16. Nozzle 11 is connected by a conduit, as shown, to an air-operated registering device 18. The measuring nozzle 9 is connected, as in FIG. 1, by a conduit 32 to a measuring and recording device 17.

The apparatus shown in FIG. 2 operates as follows:

During the measuring process disc 14, together with cam disc 13, remain fixed from rotation with respect to the surface of the hole 10 by the resilient tips 15. When the base element 4 of the measuring head is rotated, the left-hand, cam following end of flat spring 12 slides along the lobe of cam disc 13, thereby displacing the portion of the spring 12 which overlies the nozzle 11. The linear radial displacement of spring 12 is proportional to the angle of rotation of the base element 4 with respect to the hole 10. The motion of the portion of the spring 12 opposite nozzle 11 is proportionally decreased because of the difference of deformations of the spring along its length. Thus the signal from nozzle 11 forwarded to registering device 18 is proportional to the angle of rotation of the measuring head including the base element 4. The two signals from nozzles 9 and 11, after amplification in the respective devices 17 and 18, can be read visually, or can be recorded in the form of a profilogram. It is to be understood that the measuring of the relative rotation of base element 4 and disc 14 can be effected by the use of known transducers other than that described above.

In the third illustrative embodiment of the measuring apparatus of the invention, shown in FIG. 3, a holder 1, linked by means of flexible conduits 2 and 32 with base element 4, is fixedly mounted in a rotatable sleeve 25. Sleeve 25 is journalled in bearings in a handle 22, and is rotated at a constant angular speed by means of a ring gear 19 fixedly connected to the sleeve 25, a pinion 20 in constant mesh with gear 19, and a constantspeed driving means 21.

The apparatus of FIG. 3 operates as follows:

During the measuring operation, the handle 22 remains immovable. Driving means 21 rotates the sleeve 25 and the holder 1 at a constant angular speed. The angle of rotation of the base element 4 is thus proportional to time, and the profilogram of the hole being measured is obtained by recording the signal from measuring nozzle 9 on a chart which is moving linearly at a constant speed.

For measuring the non-circularity of the hole in various transverse sections thereof, the holder 1 can be displaced and fixed in an axial direction with respect to the sleeve 25.

It is to be understood that, in accordance with the broader aspects of the invention, in each of the disclosed embodiments of the apparatus instead of pneumatic transducers there may be employed other measuring transducers, such as those operating by induction, electrical capacity, or the like. The measuring device of the invention, however, is particularly advantageous where pneumatic nozzles are employed as the measuring transducers.

Although the invention is illustrated and described with reference to a preferred plurality of embodiments thereof, it is to be understood that it is in no way limited by the disclosure of such a preferred plurality of embodiments, but is capable of numerous modifications within the scope of the appended claims.

What is claimed is:

1. Apparatus for measuring non-cylindricity of surfaces, comprising a circular cylindrical base element, at least one surface measuring transducer in the form of a pneumatic nozzle mounted in a radial hole in the base element, the outer end of the nozzle and the outer surface of the base element lying on a common circular cylinder, there being a hollow in the outer surface of the base element surrounding the outer end of the transducer, a channel within the body of the base element connecting the hollow with the atmosphere, and means on the bae element providing at least one aerostatic support between the base element and the surface being measured, the surface being measured is a generally circular cylindrical opening within which the base element is inserted.

2. Apparatus according to claim 1, comprising means on the base element providing an aerostatic self-centering support between the base element and the surface of the opening being measured, and separate sources of compressed air for supplying the nozzle and the means providing the aerostatic support.

3. Apparatus according to claim 1, comprising means for turning the holder at constant speed with respect to the portable body.

4. Apparatus for measuring non-cylindricity of surfaces, comprising a circular cylindrical base element, at least one surface measuring transducer mounted in a radial hole in the base element, there being a hollow in the outer surface of the base element surrounding the outer end of the transducer, and a channel within the body of the base element connecting the hollow with the atmosphere, the surface being measured is a generally circular cylindrical opening within which the base element is inserted, means for measuring the angle through which the base element is turned about its longitudinal axis with respect to the opening being measured, said angle-measuring means comprising bore-engaging means journalled on the base element, means for retaining the bore-engaging means from turning with respect to the wall of the opening when the base element is turned with respect to said wall, means responsive to the relative rotation between the bore-engaging means and the base element, and means coupled to the last-named means for recording signals therefrom which are functions of said relative rotation.

* * * * *